US010901928B2

United States Patent
Rajabian-Schwart et al.

(10) Patent No.: US 10,901,928 B2
(45) Date of Patent: Jan. 26, 2021

(54) DATA ACCESS CONTROL IN AN OPEN SYSTEM ARCHITECTURE

(71) Applicant: Government of the United States, as represented by the Secretary of the Air Force, Wright-Patterson AFB, OH (US)

(72) Inventors: Vahid M. Rajabian-Schwart, Columbus, OH (US); Nicholas S. Kovach, Springfield, OH (US); Kenneth Littlejohn, Englewood, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 69 days.

(21) Appl. No.: 15/897,216

(22) Filed: Feb. 15, 2018

(65) Prior Publication Data

US 2019/0251050 A1    Aug. 15, 2019

(51) Int. Cl.
  *G06F 7/04* (2006.01)
  *G06F 13/362* (2006.01)
  *G06F 21/62* (2013.01)
  *H04N 7/16* (2011.01)
  *H04L 29/06* (2006.01)

(52) U.S. Cl.
  CPC ............ *G06F 13/362* (2013.01); *G06F 21/62* (2013.01); *H04L 63/10* (2013.01)

(58) Field of Classification Search
  CPC .......... G06F 13/362; G06F 21/62; H04L 63/10
  See application file for complete search history.

(56) References Cited

U.S. PATENT DOCUMENTS

| | | | |
|---|---|---|---|
| 5,504,777 A | 4/1996 | Hawkins et al. | |
| 5,640,333 A | 6/1997 | Hawkins et al. | |
| 5,689,527 A | 11/1997 | Hawkins et al. | |
| 5,712,872 A | 1/1998 | Hawkins et al. | |
| 6,098,133 A * | 8/2000 | Summers | G06F 13/36 380/52 |
| 7,055,038 B2 | 5/2006 | Porter et al. | |
| 7,281,076 B2 | 10/2007 | Yates et al. | |

(Continued)

*Primary Examiner* — Darshan I Dhruv
(74) *Attorney, Agent, or Firm* — AFMCLO/JAZ

(57) ABSTRACT

Protection and integration of proprietary data in an open system architecture, which includes at least one sub-system, and which must comply with an open standard interface mandated by the system owner. The open standard interface defines the set of messages or signals which may be exchanged by sub-system components. The sub-system provider computer is granted a bridge node to instantiate within their controlled sub-system boundary. The bridge node communicates with the sub-system components via the interchangeable open standard interface and relays messages or signals to other sub-system bridge nodes through a shared common bus. The sub-system provider may protect their proprietary data in their standard interface implementation from the system owner and/or other sub-system providers in the overall system. This is achieved by removing the need for sub-system providers to share their open standard interface implementations with each other in order to integrate together into the overall system.

10 Claims, 15 Drawing Sheets

(56) References Cited

U.S. PATENT DOCUMENTS

| | | | |
|---|---|---|---|
| 7,502,470 B2 | 3/2009 | Hanko et al. | |
| 7,996,899 B1 | 8/2011 | Bruner et al. | |
| 9,026,755 B2* | 5/2015 | Bruner | G06F 21/10 |
| | | | 711/163 |
| 9,122,870 B2 | 9/2015 | Ford | |
| 2002/0178207 A1* | 11/2002 | McNeil | G06F 15/8023 |
| | | | 718/102 |
| 2003/0221030 A1* | 11/2003 | Pontius | G06F 12/1483 |
| | | | 710/107 |
| 2005/0203892 A1* | 9/2005 | Wesley | G06F 21/6227 |
| 2007/0142934 A1* | 6/2007 | Boercsoek | G05B 19/4185 |
| | | | 700/23 |
| 2011/0307557 A1* | 12/2011 | Kadashevich | G06Q 10/107 |
| | | | 709/205 |
| 2012/0005721 A1* | 1/2012 | Xu | G06F 21/79 |
| | | | 726/1 |
| 2012/0216273 A1* | 8/2012 | Rolette | H04L 63/0209 |
| | | | 726/13 |
| 2015/0003443 A1* | 1/2015 | Koenigseder | H04L 12/4625 |
| | | | 370/350 |
| 2015/0301980 A1* | 10/2015 | Sengoku | G06F 13/4291 |
| | | | 710/105 |
| 2017/0243631 A1* | 8/2017 | King | G06F 13/4217 |

\* cited by examiner

DATA ACCESS CONTROL IN AN OPEN SYSTEM ARCHITECTURE

GOVERNMENT INTEREST

The invention described herein may be manufactured and used by or for the Government of the United States for all government purposes without the payment of any royalty.

BACKGROUND

Field of the Invention

The embodiments herein generally relate to data access control in integrated computer systems, and more particularly to data access control in an open system architecture with connected sub-systems having their own proprietary data.

Background of the Invention

An Open Systems Architecture (OSA) approach seeks to define a system architecture that makes use of standard interfaces to simplify the integration of sub-system components and reduce the cost of component upgrades. The OSA standard interface is "open" in the sense that it is available and agreed upon by either (1) the public or (2) a select group of invested entities. An open system architecture is primarily achieved by the system owner mandating the use of a Standard Interface (SI) as part of integration of system subcomponents. Through the adoption of an open SI, the system owner is not locked-in to proprietary interfaces of sub-systems offered by different providers.

In an OSA environment, a sub-system provider must adhere to the standard interface mandated by the system owner. The standard defines a set of messages or signals referred to as the "Open Standard Interface" or simply the "Open SI." The expectation of an OSA compliant sub-system is that it must implement the Open SI as an interface. Therefore, the provider must produce a subcomponent solution containing a data processing system, hardware, or a combination thereof that integrates with the overall system using the open SI while performing its unique function. The unique function of the sub-system is often protected intellectual property rights. In an example, a set of instructions on a processor may make use of an open SI through an application programming interface (API). A process can therefore interface with another standard compliant foreign process through its API with no knowledge of the internal instructions of the foreign process. Likewise, an electronic circuit can interface with a standard compliant device with no knowledge the internal device logic and circuitry arrangement.

In order for a sub-system provider to comply with a mandated open standard, they must generally provide the system owner and/or other sub-system providers with their proprietary implementation of the open standard interface. In such an environment, several problems arise including: (1) the Open SI implementation intellectual property (e.g., proprietary data) must be shared with the system owner and/or other sub-system providers, (2) it is difficult to characterize the standard implementation because the underlying transport could be unique to the sub-system and vary from provider to provider, (3) all sub-systems must use the same Open SI implementation and underlying transport to interface with each other, and (4) the system owner does not control the underlying Open SI implementation transport and therefore cannot absolutely enforce integration controls. Furthermore, each sub-system provider will likely wish to develop their own Open SI implementation instead of relying on the data processing systems or hardware of other providers.

BRIEF SUMMARY OF THE INVENTION

In view of the foregoing, an embodiment herein provides a method comprising providing a host computer system; establishing a common bus interface communicatively linked to the host computer system; linking a plurality of sub-computer systems, which are integrated to a common open system architecture standard, with the host computer system, each sub-computer system of the plurality of sub-computer systems being linked to the common bus interface and comprising data-controlled implementation instructions of an open system integration based on the common open system architecture standard, and each sub-computer system comprising a data bus communicatively linked with the common bus interface; transmitting a first data sharing request by a first sub-computer system of the plurality of sub-computer systems to the common bus interface; receiving the first data sharing request by a second sub-computer system of the plurality of sub-computer systems from the common bus interface; filtering, by the second sub-computer system, the first data sharing request based on second sub-computer system data-controlled implementation instructions; and transmitting, by the second sub-computer system, the first data sharing request to a second sub-computer system data bus when the second sub-computer system data-controlled implementation instructions accept the first data sharing request.

Each sub-computer system may be shielded from sharing data with other sub-computer systems of the plurality of sub-computer systems based on the data-controlled implementation instructions associated with each sub-computer system. The method may comprise filtering, by the first sub-computer system, the first data sharing request based on first sub-computer system data-controlled implementation instructions prior to transmitting the first data sharing request to the common bus interface. Each sub-computer system may comprise a component linked to the common bus interface to generate a data sharing request and process an accepted data sharing request.

The method may comprise transmitting the first data sharing request to the common bus interface in a first communication transport protocol; and encapsulating, by the common bus interface, the first data sharing request in a second communication transport protocol that is different from the first communication transport protocol. Each sub-computer system may comprise proprietary data comprising any of programming logic, system configuration data, system operating condition data, and system capability data that is shared with other sub-computer systems of the plurality of sub-computer systems only when data-controlled implementation instructions of a particular sub-computer system permits sharing. The method may comprise refusing a data sharing request by any of the plurality of sub-computer systems when data-controlled implementation instructions of a particular sub-computer system that is being requested to share data rejects the data sharing request.

A system for controlling data access comprising a host computing device; a shared transport medium linked to the host computing device; a plurality of sub-computing devices integrated to a common open system architecture standard with the host computing device, each sub-computing device of the plurality of sub-computing devices being integrated to the shared transport medium and comprising data-controlled implementation instructions of an open system integration based on the common open system architecture standard, and each sub-computing device comprising a data bus communicatively linked with the shared transport medium; a first sub-computing device to transmit a first signal to the shared transport medium; and a second sub-computing device to access the first signal on the shared transport medium; and process the first signal when second sub-computing device data-controlled implementation instructions permit processing of the first signal.

Each sub-computing device may be shielded from sharing data with other sub-computing devices of the plurality of sub-computing devices based on the data-controlled implementation instructions associated with each sub-computing device. Each sub-computing device may comprise a filter to accept or reject a signal based on the data-controlled implementation instructions associated with the sub-computing device being asked to accept or reject the signal.

Each sub-computing device may comprise a transceiver to transmit, access, and receive a signal from the shared transport medium. The transceiver of each sub-computing device may transmit the signal from the shared transport medium to the data bus of the sub-computing device being asked to accept or reject the signal when the data-controlled implementation instructions of the sub-computing device being asked to accept or reject the signal accepts the signal.

Each sub-computing device may comprise proprietary data comprising any of programming logic, system configuration data, system operating condition data, and system capability data that is shared with other sub-computing devices of the plurality of sub-computing devices only when data-controlled implementation instructions of a particular sub-computing device permits sharing. Any of the plurality of sub-computing devices may refuse a signal by when data-controlled implementation instructions of a particular sub-computing device that is being requested to share data rejects the signal.

Another embodiment provides a system for performing data integration in an open system architecture, the system comprising a host processing component to establish a common open standard interface; and at least one sub-processing component communicatively linked to the host processing component, wherein the at least one sub-processing component integrates with the common open standard interface and comprises a defined space within an integrated system comprising the host processing component, the at least one sub-processing component, and other sub-processing components; a memory storing open system integration implementation data unique to the at least one sub-processing component; and a filter comprising computer-executable access permission instructions to control access of any of a message, electrical signal, and data associated with the open system integration implementation data to the host processing component or the other sub-processing components. The system also includes a shared transport medium to exchange any of the message, electrical signal, and data processed through the filter with the host processing component or the other sub-processing components based on the computer-executable access permission instructions.

Any of the at least one sub-processing component and the other sub-processing components may comprise a computer processing card containing any of a computer-executable program, routine, application, applet, service, and object executable by a processor. The shared transport medium may comprise a shared common bus. The at least one sub-processing component may transmit any of the message, electrical signal, and data from the shared transport medium to the host processing component. The at least one sub-processing component may transmit any of the message, electrical signal, and data from the host processing component to the shared transport medium. Each sub-processing component may be shielded from sharing data with other sub-processing components based on computer-executable access permission instructions set by each sub-processing component.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE INVENTION

Figure 1:
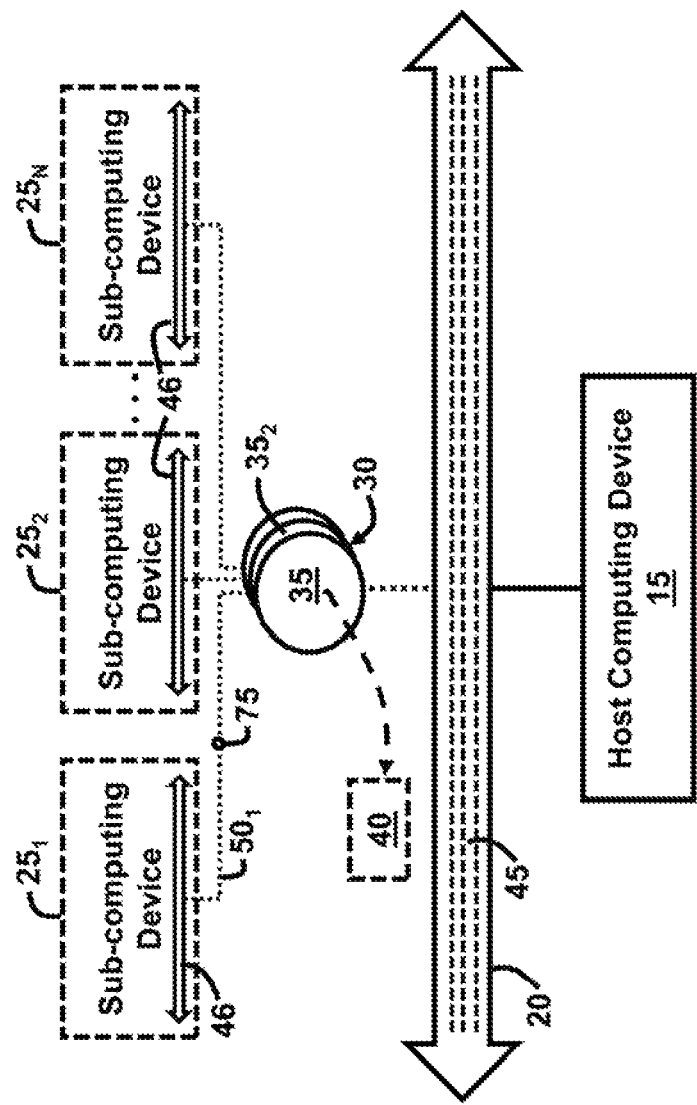
FIG. 1 is a block diagram illustrating a system of sub-computing devices, according to an embodiment herein.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

In the drawings, the size and relative sizes of layers and regions may be exaggerated for clarity. The embodiments herein provide an open architecture bridge (also referred to herein as the "bridge") method and apparatus for the protection and integration of proprietary Open SI implementations. The embodiments herein provide a method and apparatus for the protection of proprietary data of a sub-computer system (also referred to as a "sub-system" herein) in an open systems architecture by eliminating the need to share proprietary standard interface implementations. The embodiments herein use a common bus as a shared transport medium. The common bus comprises multiple bridge nodes, wherein the bridge nodes communicate in a broadcast (one-to-all) or unicast (one-to-one) manner through the shared common bus. Each sub-system provider component is granted a bridge node and a bounded space (logical or physical) within the system. The sub-system provider component maintains control over all system components within the boundary of the sub-system provider component. The sub-system provider component instantiates a bridge node at or within a controlled boundary of the sub-system provider component. The bridge node shares messages or signals through the shared common bus, whereas the messages or signals are defined in the open architecture standard. The bridge enables standard messages or signals to be shared across multiple bridge nodes, and enables sub-systems to interface with each other through the exchange of messages or signals defined in the OSA standard. Accordingly, the embodiments herein afford the sub-system provider the possibility to protect their proprietary data in their standard interface implementation from the system owner and/or other subcomponents in the system, and enable the system owner to facilitate sub-system integration through establishment of the shared common bus. As such, the bridge eases integration and compliance check of sub-systems through the exchange of standard messages or signals on the common bus. Referring now to the drawings, and more particularly to FIGS. 1 through 16, where similar reference characters denote corresponding features consistently throughout, there are shown exemplary embodiments.

FIG. 1 is a block diagram illustrating a system 10a for controlling data access, according to an example. The system 10a comprises a host computing device 15. In an example, the host computing device 15 may comprise an individual processor or processing component, a computer, a computer system, a data processing system, a hardware circuit, an electronic device, or any other device that may have data transmission, reception, and processing capabilities. The system 10a also comprises a shared transport medium 20 linked to the host computing device 15. In an example, the shared transport medium 20 may be configured as a shared common bus 45 that facilities the transfer of data among linked components, devices, and/or systems. The shared common bus 45 may be configured as a parallel bus or serial bus, according to various examples. The shared transport medium 20 is established by an owner of the system 10a, in an example. The shared transport medium 20 may be configured as a TCP/IP network over Ethernet or fiber, and may contain network routers and switches to interconnect a plurality of sub-computing devices $25_1 \ldots 25_N$.

As such, the plurality of sub-computing devices $25_1 \ldots 25_N$ are integrated to a common open system architecture standard 30 with the host computing device 15 through the shared transport medium 20. The plurality of sub-computing devices $25_1 \ldots 25_N$ may be integrated with the host computing device 15 either through any of a wireless and wired communication link through the shared transport medium 20. Moreover, the plurality of sub-computing devices $25_1 \ldots 25_N$ may communicate with each other and exchange data with each other through the shared transport medium 20. The open system architecture standard (or interface) 30 comprises a computer-implemented set of instructions 35 that define the set of messages or signals which may be exchanged by the plurality of sub-computing devices $25_1 \ldots 25_N$. In other examples, the open system architecture standard 30 may comprise plug-in modules from different providers/vendors/sub-systems that are configured to interact with the system 10a. In various examples, the plurality of sub-computing devices $25_1 \ldots 25_N$ may each comprise an individual processor or processing component, a computer, a computer system, an electronic device, or any other device that may have data transmission, reception, and processing capabilities. Each sub-computing device of the plurality of sub-computing devices $25_1 \ldots 25_N$ is integrated to the shared transport medium 20 and comprises data-controlled implementation instructions 35 of an open system integration 40 based on the common open system architecture standard 30. The open system integration 40 may be a set of rules provided by the common open system architecture standard 30. As such, the plurality of sub-computing devices $25_1 \ldots 25_N$ adhere to the established common open system architecture standard 30. Moreover, each sub-computing device $25_1 \ldots 25_N$ comprises a data bus 46 communicatively linked with the shared transport medium 20. The data bus 46 may comprise any of a parallel bus or a serial bus to facilitate communication of the sub-computing device $25_1 \ldots 25_N$, according to various examples.

A first sub-computing device $25_1$ is provided to transmit a first signal $50_1$ to the shared transport medium 20. The first signal $50_1$ may be transmitted wirelessly or through a wired link to the shared transport medium 20. Furthermore, the first signal $50_1$ may be encoded with data 75 associated with the first sub-computing device $25_1$, which may be generated in real-time or pre-programed and transmitted by the first sub-computing device $25_1$ upon a set transmission sequence or program. A second sub-computing device $25_2$ is provided to access the first signal $50_1$ on the shared transport medium 20, and process the first signal $50_1$ when second sub-computing device data-controlled implementation instructions $35_2$ permit processing of the first signal $50_1$.

According to an example, each sub-computing device is shielded from sharing data 75 with other sub-computing devices of the plurality of sub-computing devices $25_1 \ldots 25_N$ based on the data-controlled implementation instructions 35 associated with each sub-computing device $25_1 \ldots 25_N$. In this regard, the shielding of the data 75 prevents each sub-computing device from having its proprietary data shared, distributed, or otherwise transmitted to other sub-computing devices of the plurality of sub-computing devices $25_1 \ldots 25_N$ in the system 10a.

Figure 2:
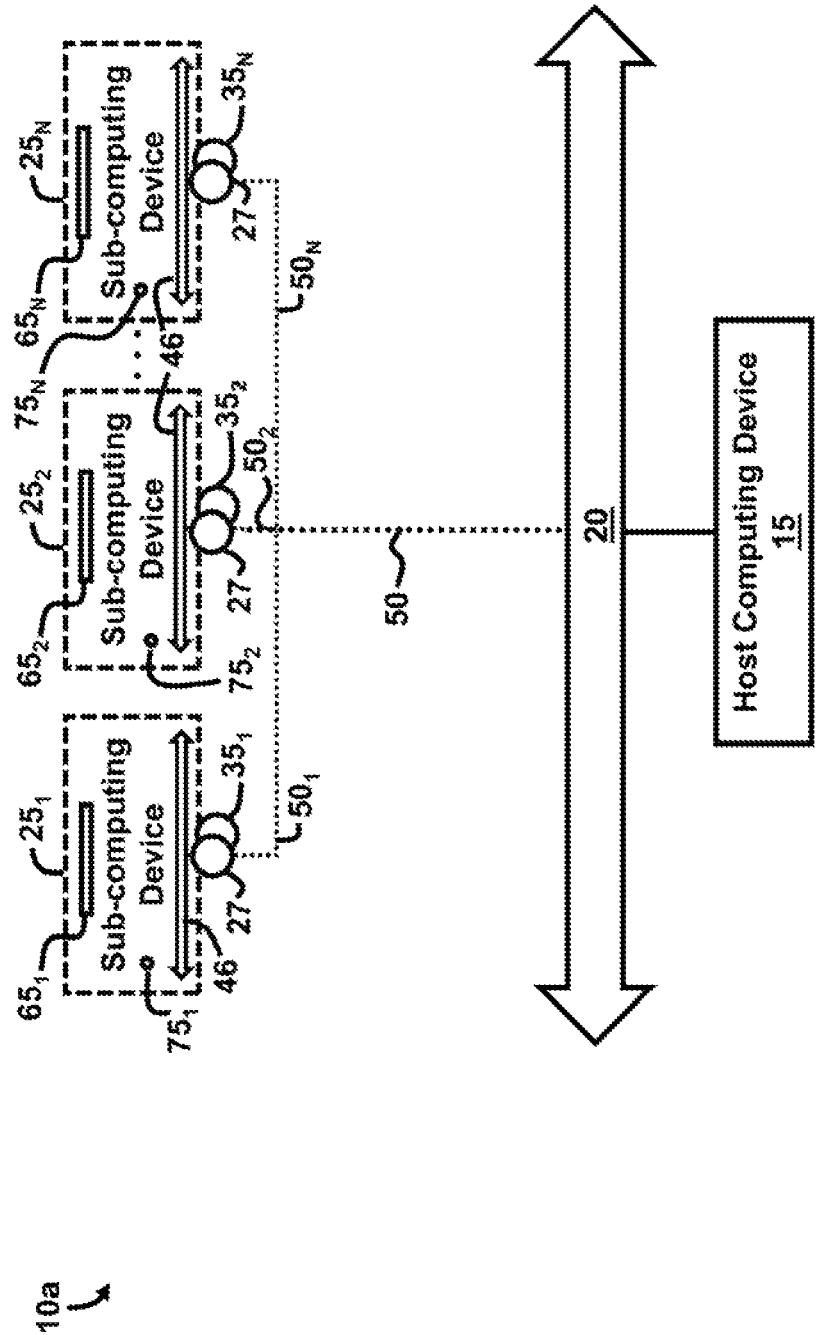
FIG. 2 is a block diagram illustrating another system of sub-computing devices, according to an embodiment herein.

As shown in FIG. 2, with reference to FIG. 1, each sub-computing device $25_1 \ldots 25_N$ comprises a filter (e.g., bridge node) 27 to accept or reject a signal $50_1 \ldots 50_N$ based on the data-controlled implementation instructions $35_1 \ldots 35_N$ associated with the sub-computing device (e.g., sub-computing device $25_1$, in an example) being asked to accept or reject the signal 50. In the examples, signal 50 may refer to any of the signals $50_1 \ldots 50_N$ transmitted from the plurality of sub-computing devices $25_1 \ldots 25_N$, respectively. The filter (e.g., bridge node) 27 may be hardware or software enabled and may be configured with logic components to accept/reject the signal 50. Each sub-computing device $25_1 \ldots 25_N$ may transmit a signal 50 to the shared transport medium 20, and likewise each sub-computing device $25_1 \ldots 25_N$ may receive the signal 50 from the shared transport medium 20. The signal 50 may be an analog or digital signal, and may be wireless or wired signals, according to various examples. For example, the first sub-computing device $25_1$ may transmit a first signal $50_1$ to the shared transport medium 20. The second sub-computing device $25_2$ may transmit a second signal $50_2$ to the shared transport medium 20, and the shared transport medium 20, etc. In other example, the first sub-computing device $25_1$ may receive the second signal $50_2$ from the shared transport medium 20 if permitted by the data-controlled implementation instructions $35_2$ of the second sub-computing device $25_2$. Each sub-computing device $25_1 \ldots 25_N$ may comprise a transceiver $65_1 \ldots 65_N$ to transmit, access, and receive the signal 50 from the shared transport medium 20.

The transceivers $65_1 \ldots 65_N$ of each sub-computing device $25_1 \ldots 25_N$ is to transmit the signal 50 from the shared transport medium 20 to the data bus 46 of the sub-computing device $25_1 \ldots 25_N$ being asked to accept or reject the signal 50 when the data-controlled implementation instructions $35_1 \ldots 35_N$ of the sub-computing device $25_1 \ldots 25_N$ being asked to accept or reject the signal 50 accepts the signal 50. For example, the second sub-computing device $25_1$ may comprise a transceiver $65_2$ that transmits signal $50_2$ from the shared transport medium 20 to the data bus 46 of the first sub-computing device $25_1$ based on the data-controlled implementation instructions $35_1$ of the first sub-computing device $25_1$. In the examples, data-controlled implementation instructions 35 may refer to any of the data-controlled implementation instructions $35_1 \ldots 35_N$ associated with the plurality of sub-computing devices $25_1 \ldots 25_N$, respectively.

In an example, each sub-computing device $25_1 \ldots 25_N$ comprises proprietary data $75_1 \ldots 75_N$ comprising any of programming logic, system configuration data, system operating condition data, and system capability data that is shared with other sub-computing devices of the plurality of sub-computing devices $25_1 \ldots 25_N$ only when data-controlled implementation instructions 35 of a particular sub-computing device 25 permits sharing. For example, the first sub-computing device $25_1$ comprises proprietary data $75_1$ that is shared with the second sub-computing device $25_2$. In the examples, proprietary data 75 may refer to any proprietary data $75_1 \ldots 75_N$ associated with the plurality of sub-computing devices $25_1 \ldots 25_N$, respectively. Any of the plurality of sub-computing devices $25_1 \ldots 25_N$ may refuse the signal 50 when data-controlled implementation instructions $35_1 \ldots 35_N$ of a particular sub-computing device $25_1 \ldots 25_N$ that is being requested to share data rejects the signal 50. For example, the first sub-computing device $25_1$ may refuse the signal $50_2$ when data-controlled implementation instructions $35_1$ of the first sub-computing device $25_1$ rejects the signal $50_2$.

Figure 3:
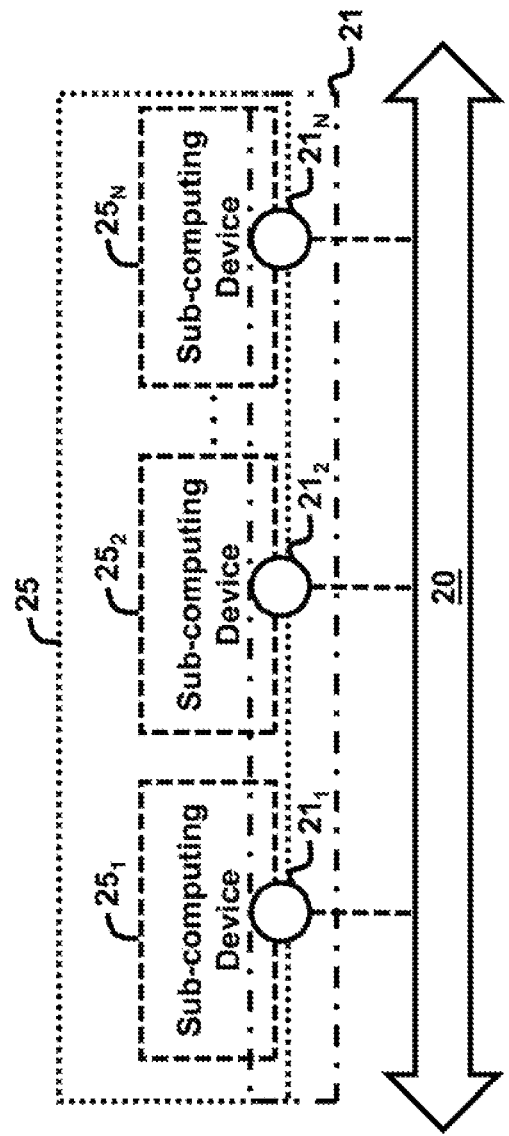
FIG. 3 is a block diagram representation of an open architecture bridge composed of two or more sub-computer systems, according to an embodiment herein.
Figure 4:
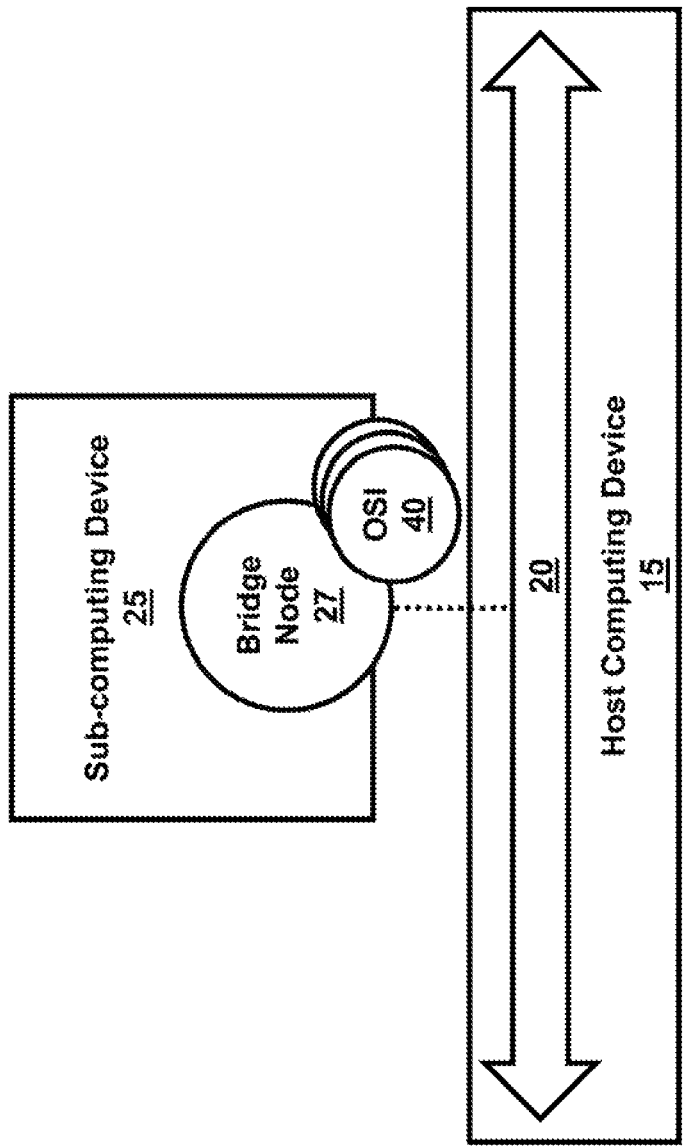
FIG. 4 is a block diagram representation of a bridge node with interchangeable open standard interface implementations, according to an embodiment herein.
Figure 5:
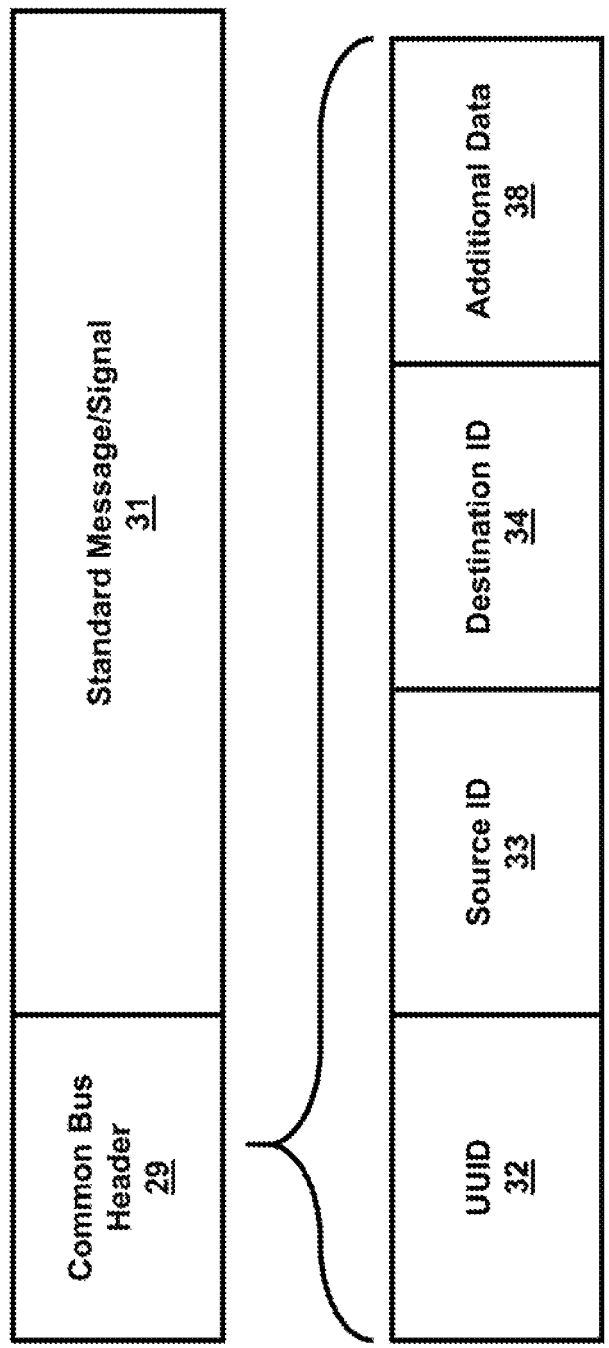
FIG. 5 is a block diagram representation of a standard message or signal relayed through a common bridge with metadata, according to an embodiment herein.

FIG. 3, with reference to FIGS. 1 and 2, illustrates a general view of a plurality of sub-computing devices $25_1 \ldots 25_N$ comprising respective interfaces $21_1 \ldots 21_N$ communicatively linked to each other through a shared transport medium 20. Each sub-computing device 25 interfaces with the shared common bus 45 through a bridge node 27, as illustrated in FIG. 4, with reference to FIGS. 1 through 3. The bridge node 27 is generally a bridge, filter, or key that allows the sub-computing device 25 to communicate with the host computing device 15. The bridge node 27 is provided to the sub-computing device 25 and is instantiated within the sub-system boundary of the sub-computing device 25. The sub-system boundary may be configured as a physical or logical (e.g., virtual network space or physical) separation, according to an example. The bridge node 27 relays messages or signals 50 between the shared common bus 45 and the proprietary bus 46 of the sub-computing device 25. The bridge node 27 makes use of the implementation instructions 35 of the sub-computing device 25 of the open system integration 40 to interface with the sub-computing device 25. In a data processing instantiation, the implementation of the open system integration 40 may be statically or dynamically loaded as a function library since it is guaranteed to provide the standard application program interface (API) calls of the open system integration 40. In a hardware instantiation, the implementation of the open system integration 40 results in a defined component interface which adheres to the defined open system architecture standard 30. For example, in a hardware description language such as Very High Speed Integrated Circuit Hardware Description Language (VHDL), the open system integration 40 would result in a "package" component whose input and output signals adhere to the open system architecture standard 30. Therefore, the bridge node 27 may interface with any Open API implementation and may be used interchangeably across a variety of sub-computing devices $25_1 \ldots 25_N$.

Each bridge node 27 interfaces with the shared common bus 45 to relay messages or signals 50 to other bridge nodes $27_N$. According to an example, the shared common bus 45 is a publish-subscribe messaging bus, which allows sub-computing devices 25 to publish messages 31 without a priori of which subscribes (e.g. receivers), if any, there may be. In such an arrangement, bridge nodes $27_1 \ldots 27_N$ communicate in a broadcast or unicast fashion over the shared common bus 45. In a broadcast (i.e., one-to-all) configuration, each bridge node 27 manages a subscription 28 for the sub-computing device 25. The message subscription 28 is used to filter irrelevant messages as determined by examining the message header 29 or through a deep-packet inspection of the message contents. In a unicast (i.e., one-to-one) configuration, each bridge node 27 sends messages 31 directly to another sub-computing device 25. Using unicast, the messages 31 are routed based on the universally unique identifier (UUID) 32 of the sub-computing device 25 and the source-destination tuple from the message header 29.

The shared common bus 45 may or may not be required to be standard-compliant. Additionally, each message 31 sent over the shared common bus 45 may require additional header information for routing purposes. The example shown in FIG. 5, with reference to FIGS. 1 through 4, identifies the minimum required fields for a standard message 31 to be routed. The standard message 31 is encapsulated by a common bus header 29, which comprises the UUID 32 of the sub-computing device 25, a source ID 33, a destination ID 34, and an additional data field 38. The UUID 32 of the sub-computing device 25 is the unique numerical identifier of the sub-computing device 25. The source ID 33 indicates which type of component within the sub-computing device 25 generated the message 31. The destination ID 34 indicates for which component type(s) the message 31 is intended. If the message 31 is intended for general consumption, such as a system "current time" or "GPS location" message, the destination field could be marked with all logical zeros or ones. The additional data field 38 may be used for future expansion of the protocol, according to an example.

Figure 6:
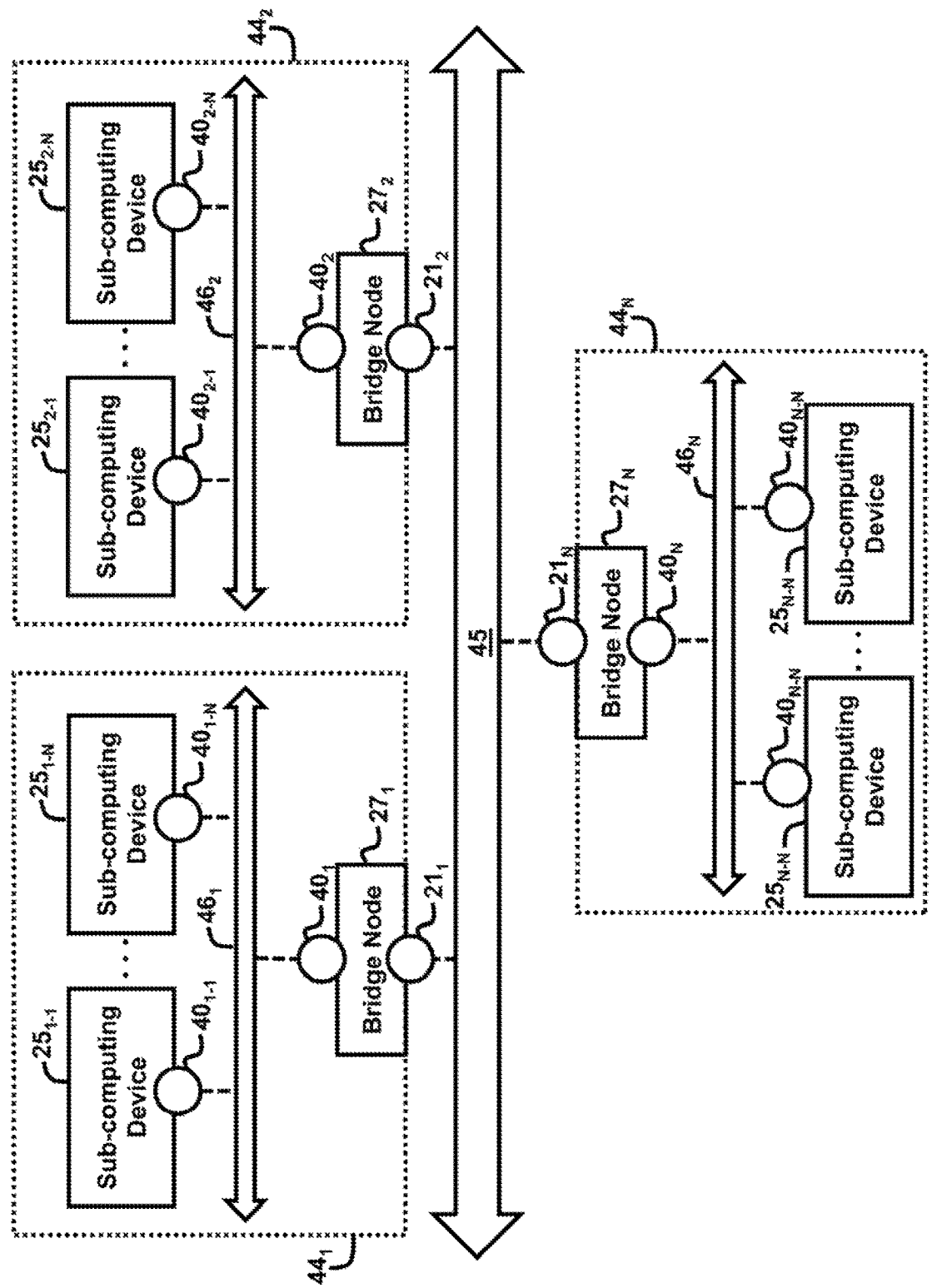
FIG. 6 is a block diagram of two or more sub-computer systems interconnected through a common bridge, according to an embodiment herein.

FIG. 6, with reference to FIGS. 1 through 5, is a block diagram illustrating a plurality of sub-computing devices $25_{1-1} \ldots 25_{1-N}$ with unique open system integrations $40_{1-1} \ldots 40_{N-N}$, respectively, communicate over the shared common bus 45 with the use of a bridge node $27_1 \ldots 27_N$. The bridge node $27_1 \ldots 27_N$ in each of the plurality of sub-computing devices $25_{1-1} \ldots 25_{1-N}$ makes use of the open system integration $40_{1-1} \ldots 40_{N-N}$ of the plurality of sub-computing devices $25_{1-1} \ldots 25_{1-N}$, which adheres to the defined common open system architecture standard 30 mandated by the owner of the system 10a. Within the system boundary $44_1 \ldots 44_N$ of the sub-computing devices $25_{1-1} \ldots 25_{1-N}$, the open system integration $40_1 \ldots 40_N$ is used natively by components of a particular sub-computing device (e.g., device $25_{1-1}$, for example), but is not required by the components of other sub-computing devices (e.g., device $25_{2-1}$, for example).

Accordingly, the system 10a provides for the protection and integration of intellectual property (e.g., proprietary data 75, for example) in an open system architecture comprising one or more sub-systems (e.g., sub-computing devices $25_1 \ldots 25_N$), which must comply with the common open system architecture standard 30 mandated by the owner of the system 10a. The sub-system provider is granted a bridge node 27 to instantiate within its controlled sub-system boundary. In an example, the bridge node $27_1$ communicates with the one or more sub-systems (e.g., sub-computing devices $25_1 \ldots 25_N$) via the shared common bus 45 and relays messages 31 or signals 50 to bridge nodes $27_2 \ldots 27_N$ of other sub-systems (e.g., sub-computing devices $25_2 \ldots 25_N$) through the shared common bus 45. The sub-computing device $25_1$ provides the possibility to protect proprietary data 75 using the open system integration 40 from an owner/provider of the system 10a and/or other sub-system providers in the system 10a. This is achieved by removing the need for sub-system providers to share their open standard interface implementations with each other in order to integrate together into a cohesive system 10a. Furthermore, the embodiments herein enable the owner of the system 10a to facilitate sub-system integration through the establishment of the shared common bus 45 communicatively linking the one or more sub-computing devices $25_1 \ldots 25_N$. As such, the separate sub-computing devices $25_1 \ldots 25_N$ are operatively connected to the shared common bus 45 through their own bridge nodes $27_1 \ldots 27_N$, respectively, such that each sub-computing device 25 is shielded from the other sub-computing devices $25_1 \ldots 25_N$ in terms of sharing interface implementations with the open system architecture standard 30, but all the sub-computing devices 25 are able to integrate into the common overall system 10a and share information, which they wish to share, with other sub-computing devices $25_1 \ldots 25_N$.

Figure 7:
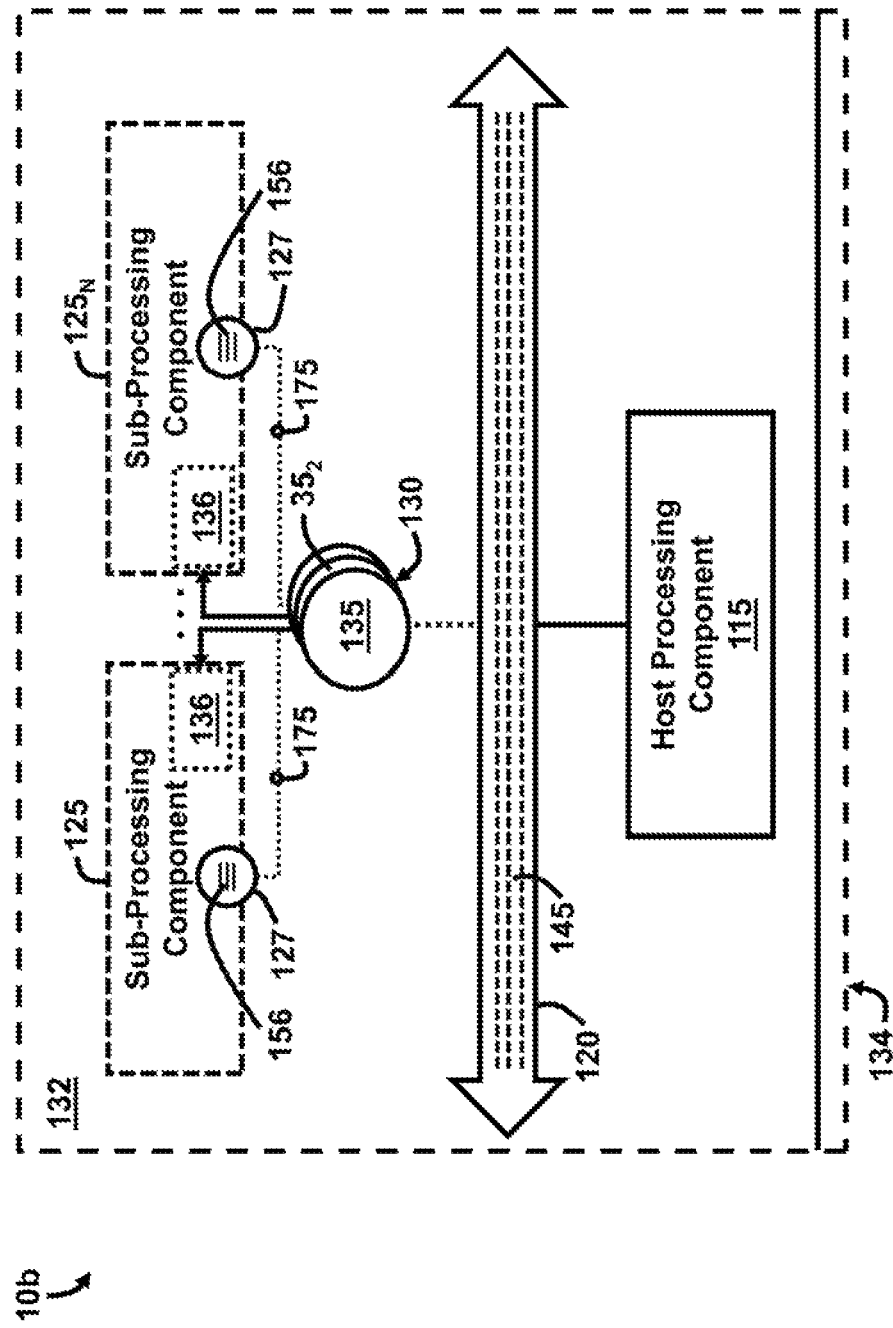
FIG. 7 is a block diagram illustrating a system of sub-processing components, according to an embodiment herein.

FIG. 7, with reference to FIGS. 1 through 6, is a block diagram illustrating a system 10b for performing data integration in an open system architecture. System 10b is similar to system 10a in terms of configuration, however, system 10b refers to components as opposed to devices to further illustrate the different configurations associated with the embodiments herein. In this regard, components may refer to individual components that are part of overall devices and/or systems and which may comprise any of electrical, magnetic, or electro-mechanical components. In some examples, a component may be a device and vice versa.

The system 10b comprises a host processing component 115 to establish a common open standard interface 130, and at least one sub-processing component 125 communicatively linked to the host processing component 115, wherein the at least one sub-processing component 125 integrates with the common open standard interface 130 and comprises a defined space 132 within an integrated system 134 comprising the host processing component 115, the at least one sub-processing component 125, and other sub-processing components $125_N$. The host processing component 115 is configured to have data transmission, reception, and processing capabilities.

The at least one sub-processing component 125 further comprises a memory 136 that stores open system integration implementation data 135 unique to the at least one sub-processing component 125. The at least one sub-processing component 125 further comprises a filter (e.g., bridge node) 127 comprising computer-executable access permission instructions 156 to control access of any of a message, electrical signal, and data 175 associated with the open system integration implementation data 135 to the host processing component 115 or the other sub-processing components $125_N$. The filter (e.g., bridge node) 127 may be hardware or software enabled and may be configured with logic components.

The system 10b further comprises a shared transport medium 120 to exchange any of the message, electrical signal, and data processed through the filter (e.g., bridge node 127) with the host processing component 115 or the other sub-processing components $125_N$ based on the computer-executable access permission instructions 156. In an example, the shared transport medium 120 comprises a shared common bus 145 that facilities the transfer of data among linked components, devices, and/or systems. The shared common bus 145 may be configured as a parallel bus or serial bus, according to various examples. The shared transport medium 120 is established by an owner of the system 10b, in an example. The shared transport medium 120 may be configured as a TCP/IP network over Ethernet or fiber, and may contain network routers and switches to interconnect the at least one sub-processing component 125.

Figure 8:
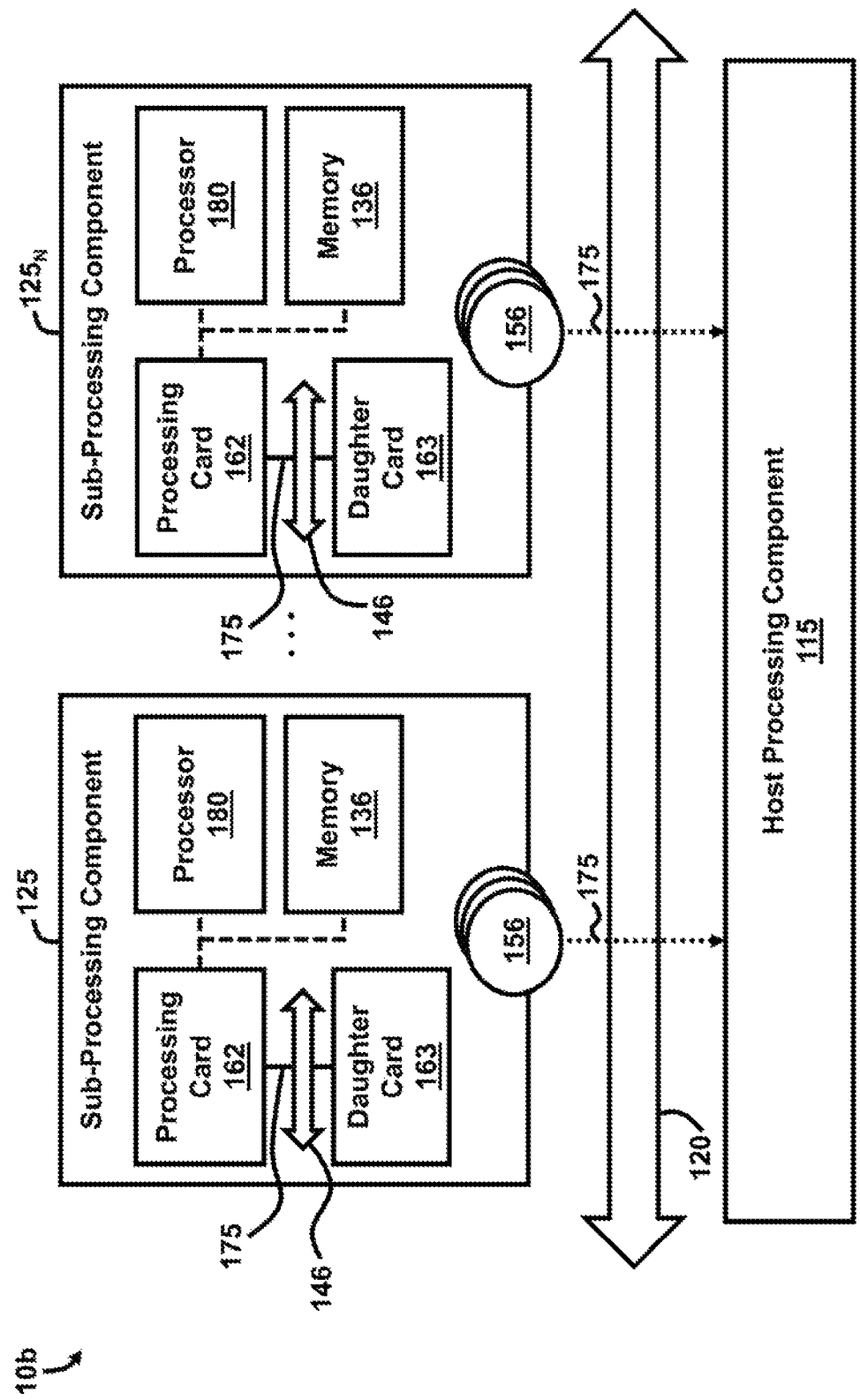
FIG. 8 is a block diagram illustrating another system of sub-processing components, according to an embodiment herein.

As shown in FIG. 8, with reference to FIGS. 1 through 7, any of the at least one sub-processing component 125 and the other sub-processing components $125_N$ may comprise a computer processing card 162 containing any of a computer-executable program, routine, application, applet, service, and object executable by a processor 180. The at least one sub-processing component 125 is configured to transmit any of the message, electrical signal, and data 175 from the shared transport medium 120 to the host processing component 115. Furthermore, the at least one sub-processing component 125 is configured to transmit any of the message, electrical signal, and data 175 from the host processing component 115 to the shared transport medium 120. Each sub-processing component 125 is shielded from sharing data 175, which may be proprietary data, with other sub-processing components $125_N$ based on computer-executable access permission instructions 156 set by each sub-processing component 125 . . . $125_N$.

The computer processing card 162 may represent a hardware example of the embodiments herein and may use a computer daughter card 163 to augment a main processing module or card 162 in order to provide a separation of proprietary data 175. The processing card 162 includes a plurality of programs, routines, applications, applets, services, objects or similar executing on any processor architecture and written in any programming language. The daughter card 163 may be configured as an expansion circuit card affixed to a motherboard or the processing card 162 which accesses memory 136 and the processor 180 directly or uses a low latency bus 146 to transfer commands, signals, and/or data 175 between the daughter card 163 and the processing card 162.

Figure 9:
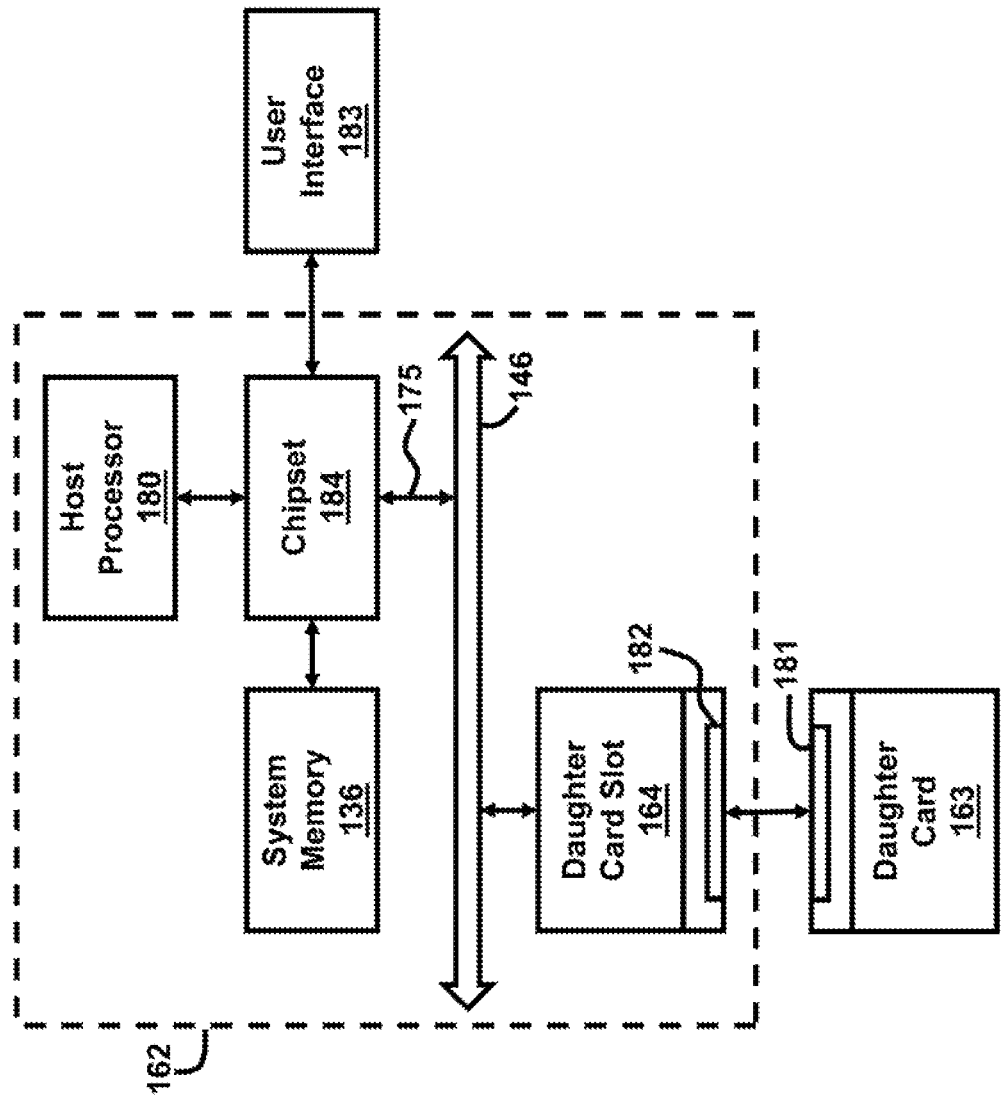
FIG. 9 is a block diagram of an interconnection of a computer daughter card and a computer daughter card slot, according to an embodiment herein.

As shown in FIG. 9, with reference to FIGS. 1 through 8, the daughter card 163 is configured to allow it to be inserted into the daughter card slot 164 of a computer processing card 162. When the connectors 181, 182 become electrically and mechanically coupled, the daughter card 163 becomes electrically coupled to bus 146 and may exchange commands, signals, and/or data 175 with system memory 136, host processor 180, and/or a user interface system 183 via a bus 146 (or other connection) and chipset 184.

Figure 10:
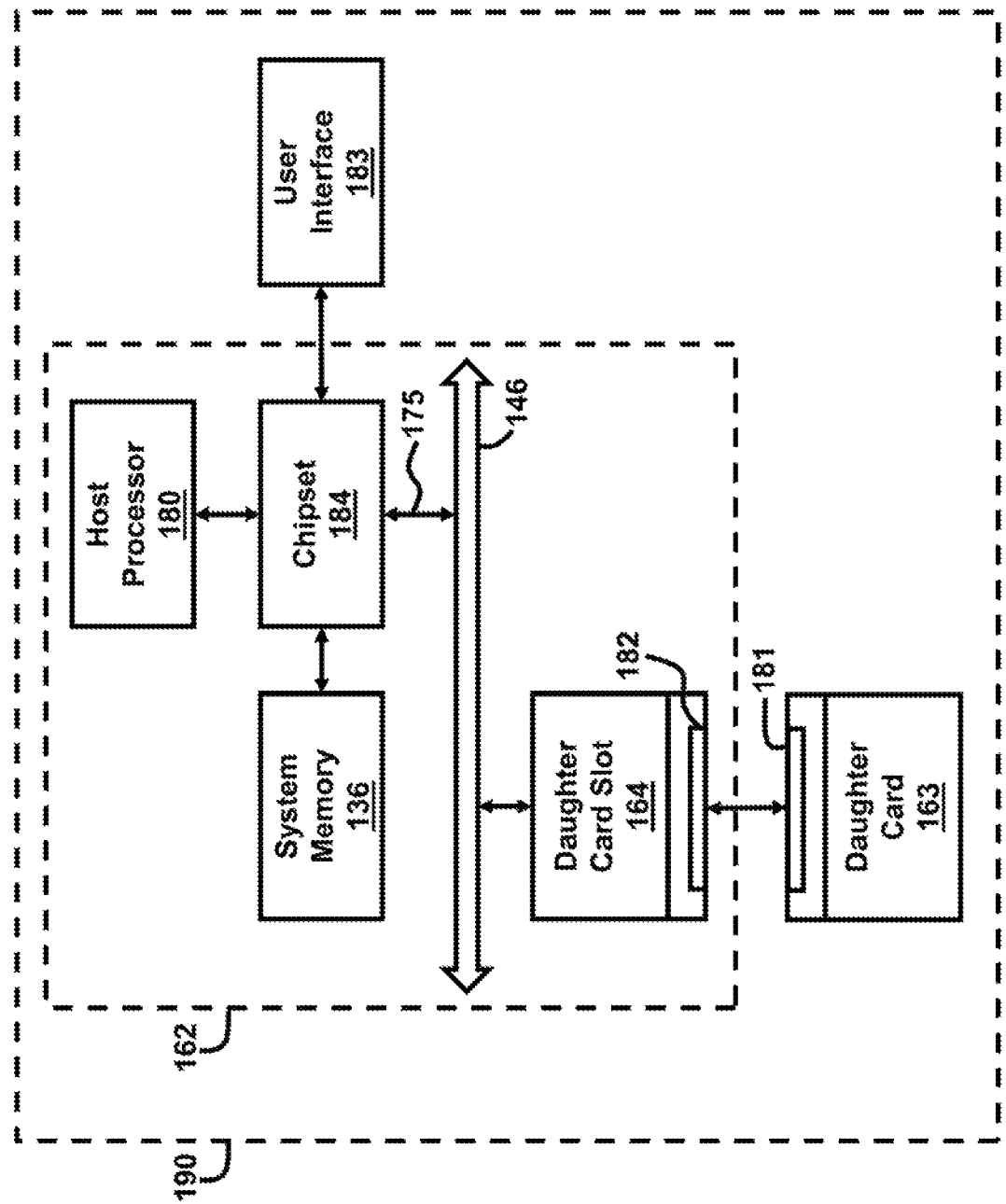
FIG. 10 is a block diagram of a sub-computer system composed of a plurality of computer daughter card-slot interconnections, according to an embodiment herein.

As shown in FIG. 10, with reference to FIGS. 1 through 9, a sub-system 190 may comprise one or more processing cards 162 and one or more daughter cards 163. These cards 162, 163 may be connected through any number of connectors 181, 182.

Figure 11:
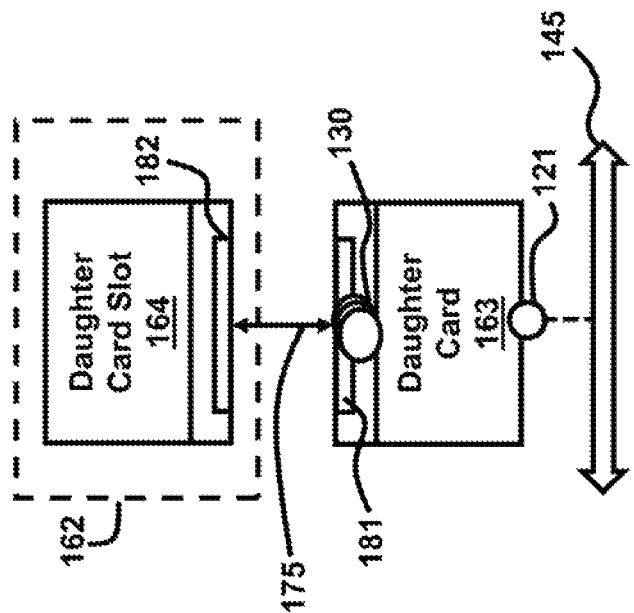
FIG. 11 is a block diagram of an interconnection of a computer daughter card which translates data from a shared common bus to an open SI computer daughter slot, according to an embodiment herein.
Figure 12:
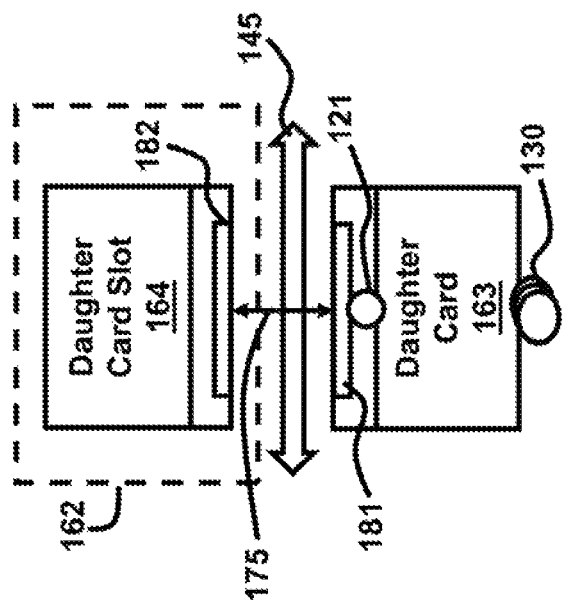
FIG. 12 is a block diagram of an interconnection of a computer daughter card which translates data from an open SI to a shared common bus computer daughter slot, according to an embodiment herein.

In FIGS. 11 and 12, with reference to FIGS. 1 through 10, the daughter card 163 serves as the bridge node 127. This allows a hardware implementation in addition to a data processing implementation of the embodiments herein. The difference in FIGS. 11 and 12 is the arrangement of interface 121 coupled to the daughter card 163. In FIG. 11, the interface 121 to the shared common bus 145 is provided between the processing card 162 and the daughter card 163 through the daughter card slot 164. The daughter card 163 translates the data 175 received from the shared common bus 145 via the interface 121 to the common open standard interface 130. In FIG. 12, the common open standard interface 130 is provided between the processing card 162 and the daughter card 163 through the daughter card slot 164. The daughter card 163 translates the data 175 received from the common open standard interface 130 to the interface 121 to the shared common bus 145.

Figure 13:
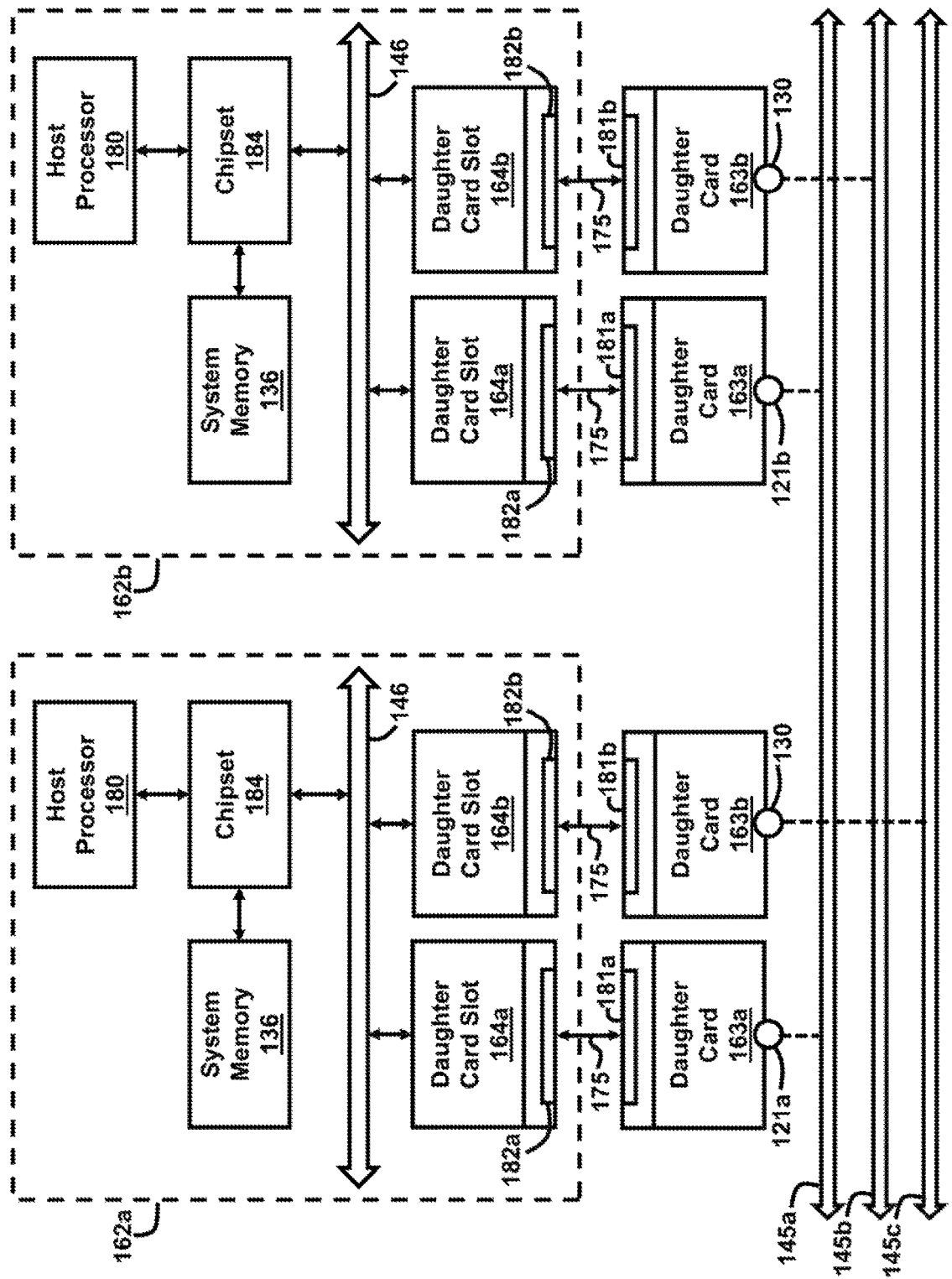
FIG. 13 is a block diagram of two computer daughter cards on two sub-computer systems used as bridge nodes in a shared common bus, according to an embodiment herein.

FIG. 13, with reference to FIGS. 1 through 12, illustrates how two daughter cards 163a, 163b, having different configurations, may be used as a bridge node. The daughter card 163a and connector 181a are identical to daughter card 163b and connector 181b, the difference is that the daughter card 163a supports the shared common bus interface 121a, 121b to the shared common bus 145a and the daughter card 163b supports the common open standard interface 130 to the shared common bus 145b, 145c. Commands, signals, and/or data 175 are passed between the daughter cards 163a, 163b to the respective daughter card slots 164a, 164b. The cards 163a, 163b may pass data 175 directly between each other or may use the processing card 162a, 162b as an intermediary.

Figure 14:
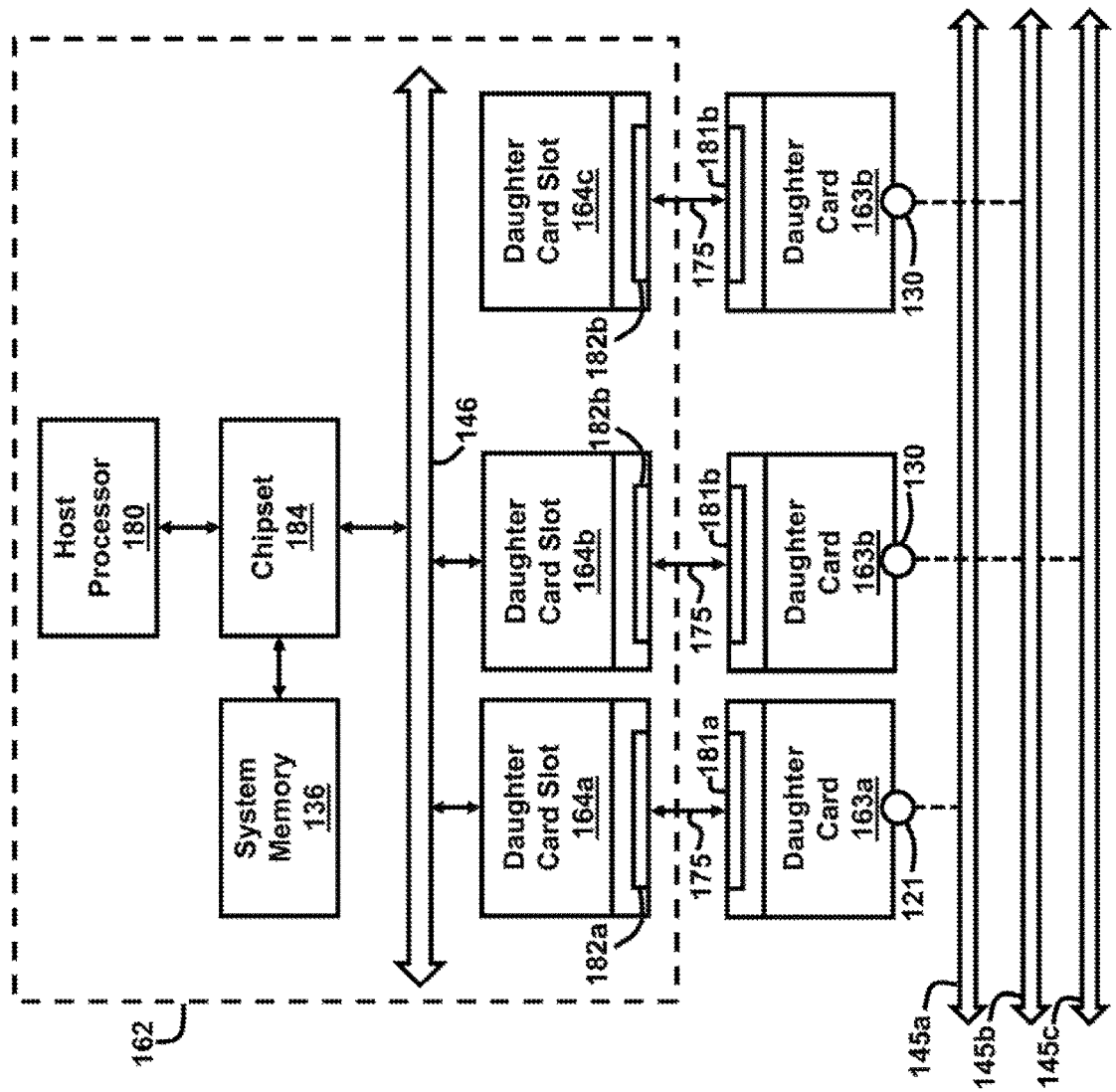
FIG. 14 is a block diagram of a computer daughter card that interfaces to the shared common bus used with two different computer daughter cards which support an open SI, according to an embodiment herein.

FIG. 14, with reference to FIGS. 1 through 13, illustrates how one daughter card 163a that supports the shared common bus interface 121 to the shared common bus 145a may be used with two different daughter cards 163b, 163c that support the common open standard interface 130. Commands, signals, and/or data 175 are passed between the daughter cards 163a, 163b, 163c. The cards 163a, 163b, 163c may pass data 175 directly between each other or may use their respective daughter card slots 164a, 164b, 164c in the processing card 162 as an intermediary.

Figure 15:
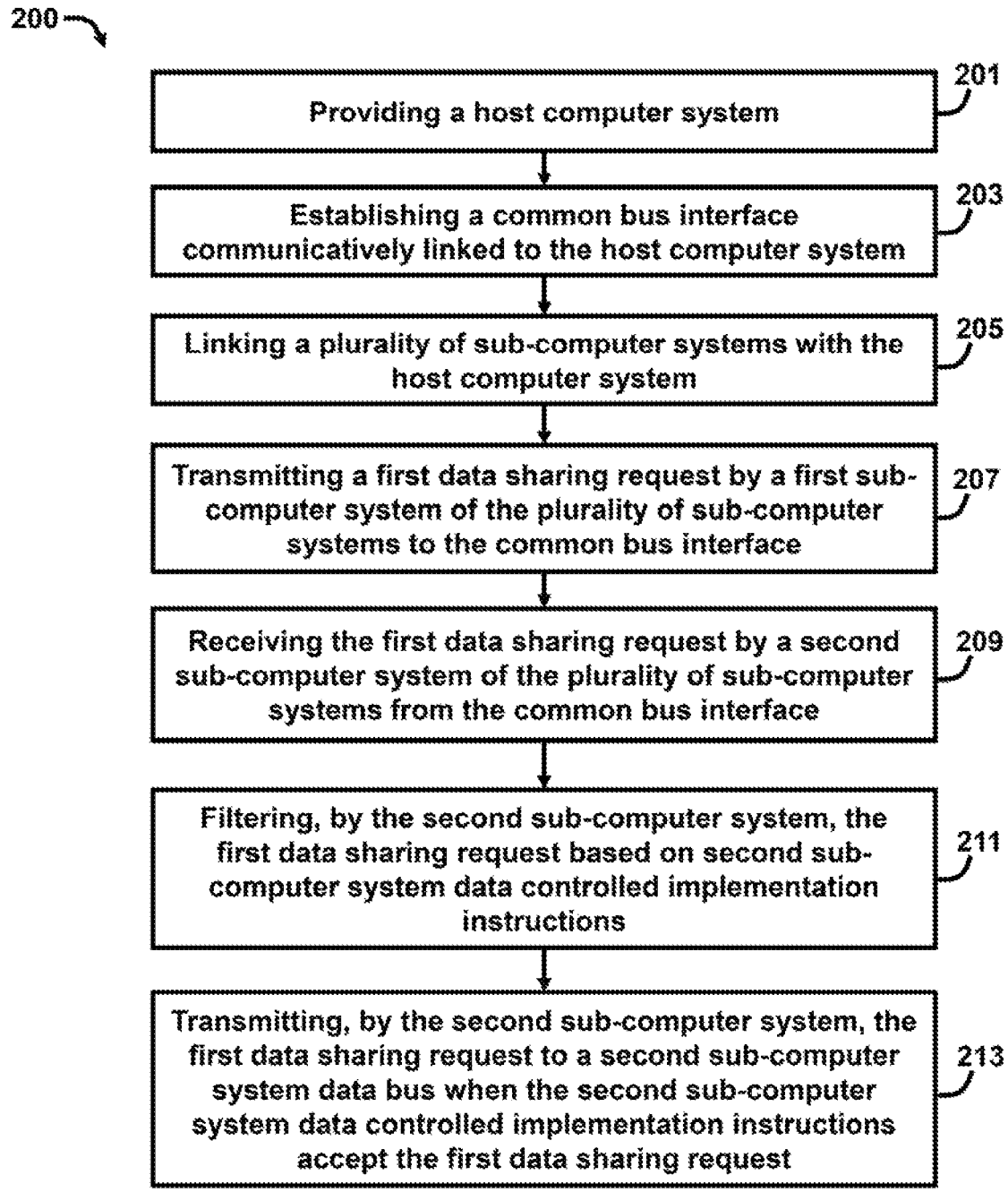
FIG. 15 is a flowchart illustrating a method, according to an embodiment herein.

FIG. 15, with reference to FIGS. 1 through 14, is a flow diagram of a method 200. Block 201 indicates providing a host computer system (e.g., host computing device 15 or host processing component 115, for example). Block 203 provides for establishing a common bus interface (e.g., shared common bus 45 or shared common bus 145, for example) communicatively linked to the host computer system (e.g., host computing device 15 or host processing component 115, for example). Block 205 provides for linking a plurality of sub-computer systems (e.g., sub-computing devices $25_1$ . . . $25_N$ or sub-processing components $125_1$ . . . $125_N$, for example), which are integrated to a common open system architecture standard (e.g., common open system architecture standard 30 or common open standard interface 130, for example), with the host computer system (e.g., host computing device 15 or host processing component 115, for example).

Each sub-computer system (e.g., sub-computing device 25 or sub-processing component 125, for example) of the plurality of sub-computer systems (e.g., sub-computing devices $25_1$ . . . $25_N$ or sub-processing components $125_1$ . . . $125_N$, for example) are linked to the common bus interface (e.g., shared common bus 45 or shared common bus 145, for example) and comprise data-controlled implementation instructions (e.g., data-controlled implementation instructions 35 or open system integration implementation data 135, for example) of an open system integration (e.g., open system integration 40, for example) based on the common open system architecture standard (e.g., common open system architecture standard 30 or common open standard interface 130, for example). Each sub-computer system (e.g., sub-computing device 25 or sub-processing component 125, for example) comprises a data bus (e.g., data bus 46, for example) communicatively linked with the common bus interface (e.g., shared common bus 45 or shared common bus 145, for example).

Block 207 provides for transmitting a first data sharing request by a first sub-computer system (e.g., first sub-computing device $25_1$ or sub-processing component $125_1$, for example) of the plurality of sub-computer systems (e.g., sub-computing devices $25_1$ . . . $25_N$ or sub-processing components $125_1$ . . . $125_N$, for example) to the common bus interface (e.g., shared common bus 45 or shared common bus 145, for example). In an example, the first data sharing request may be transmitted through a signal (e.g., first signal $50_1$, for example). Block 209 provides for receiving the first data sharing request by a second sub-computer system (e.g., second sub-computing device $25_2$ or sub-processing component $125_2$, for example) of the plurality of sub-computer systems (e.g., sub-computing devices $25_1$ . . . $25_N$ or sub-processing components $125_1$ . . . $125_N$, for example) from the common bus interface (e.g., shared common bus 45 or shared common bus 145, for example).

Block 211 provides for filtering, by the second sub-computer system (e.g., second sub-computing device $25_2$ or sub-processing component $125_2$, for example), the first data sharing request based on second sub-computer system data-controlled implementation instructions (e.g., data-controlled implementation instructions 35 or open system integration implementation data 135, for example). Block 213 provides for transmitting, by the second sub-computer system (e.g., second sub-computing device $25_2$ or sub-processing component $125_2$, for example), the first data sharing request to a second sub-computer system data bus (e.g., data bus 46, for example) when the second sub-computer system data-controlled implementation instructions (e.g., data-controlled implementation instructions 35 or open system integration implementation data 135, for example) accept the first data sharing request.

Each sub-computer system (e.g., sub-computing device 25 or sub-processing component 125, for example) is shielded from sharing data (e.g., proprietary data 75 or message, electrical signal, and data 175, for example) with other sub-computer systems of the plurality of sub-computer systems (e.g., sub-computing devices $25_1$ ... $25_N$ or sub-processing components $125_1$ ... $125_N$, for example) based on the data-controlled implementation instructions (e.g., data-controlled implementation instructions 35 or open system integration implementation data 135, for example) associated with each sub-computer system (e.g., sub-computing device 25 or sub-processing component 125, for example).

The method 200 further comprises filtering, by the first sub-computer system (e.g., first sub-computing device $25_1$ or sub-processing component $125_1$, for example), the first data sharing request based on first sub-computer system data-controlled implementation instructions (e.g., data-controlled implementation instructions $35_1$ or open system integration implementation data $135_1$, for example) prior to transmitting the first data sharing request to the common bus interface (e.g., shared common bus 45 or shared common bus 145, for example). Each sub-computer system (e.g., sub-computing device 25 or sub-processing component 125, for example) comprises a component (e.g., bridge node 27, for example) linked to the common bus interface (e.g., shared common bus 45 or shared common bus 145, for example) to generate a data sharing request and process an accepted data sharing request.

The method 200 may further comprise transmitting the first data sharing request to the common bus interface (e.g., shared common bus 45 or shared common bus 145, for example) in a first communication transport protocol, and encapsulating, by the common bus interface (e.g., shared common bus 45 or shared common bus 145, for example), the first data sharing request in a second communication transport protocol that is different from the first communication transport protocol. Each sub-computer system (e.g., sub-computing device 25 or sub-processing component 125, for example) comprises proprietary data (e.g., proprietary data 75 or message, electrical signal, and data 175, for example) comprising any of programming logic, system configuration data, system operating condition data, and system capability data that is shared with other sub-computer systems of the plurality of sub-computer systems (e.g., sub-computing devices $25_1$ ... $25_N$ or sub-processing components $125_1$ ... $125_N$, for example) only when data-controlled implementation instructions (e.g., data-controlled implementation instructions 35 or open system integration implementation data 135, for example) of a particular sub-computer system permits sharing.

The method 200 may further comprise refusing a data sharing request by any of the plurality of sub-computer systems (e.g., sub-computing devices $25_1$ ... $25_N$ or sub-processing components $125_1$ ... $125_N$, for example) when data-controlled implementation instructions (e.g., data-controlled implementation instructions 35 or open system integration implementation data 135, for example) of a particular sub-computer system that is being requested to share data rejects the data sharing request.

In another example, rather than encapsulating the standard messages 31 inside another protocol layer to be transmitted across the shared common bus (e.g., shared common bus 45 or shared common bus 145, for example), the messages 31 may be directly translated to a secondary implementation of the open system integration (e.g., open system integration 40, for example) in which case the shared common bus 45, 145 is simply a standard-compliant transport medium 20, 120, which in turn reduces processing overhead and end-to-end latency. Similarly, an underlying transport bus (not shown) may be shared by multiple sub-computer systems (e.g., sub-computing devices $25_1$ ... $25_N$ or sub-processing components $125_1$ ... $125_N$, for example), each of which have their own virtual/logical transport layer encapsulated in the same underlying transport bus.

A sub-computer system is afforded protection of its own proprietary data (e.g., data 75, 175, for example) in an open architecture system (e.g., system 10, 10b, for example) by having control within its sub-computer system boundary, which, as described above, may be configured as a physical or logical (e.g., virtual network space or physical) separation. Since the bridge node (e.g., bridge node 27, 127, for example) may interchangeably make use of any open SI implementation that adheres to the common open system architecture standard (e.g., common open system architecture standard 30 or common open standard interface 130, for example) mandated by the system owner, the bridge node 27, 127 may be provided to the sub-computer system provider to be instantiated within its sub-computer system boundary. Therefore, the sub-computer system provider does not need to provide their sub-computer system Open SI implementation to the system owner or other sub-computer system providers.

Figure 16:
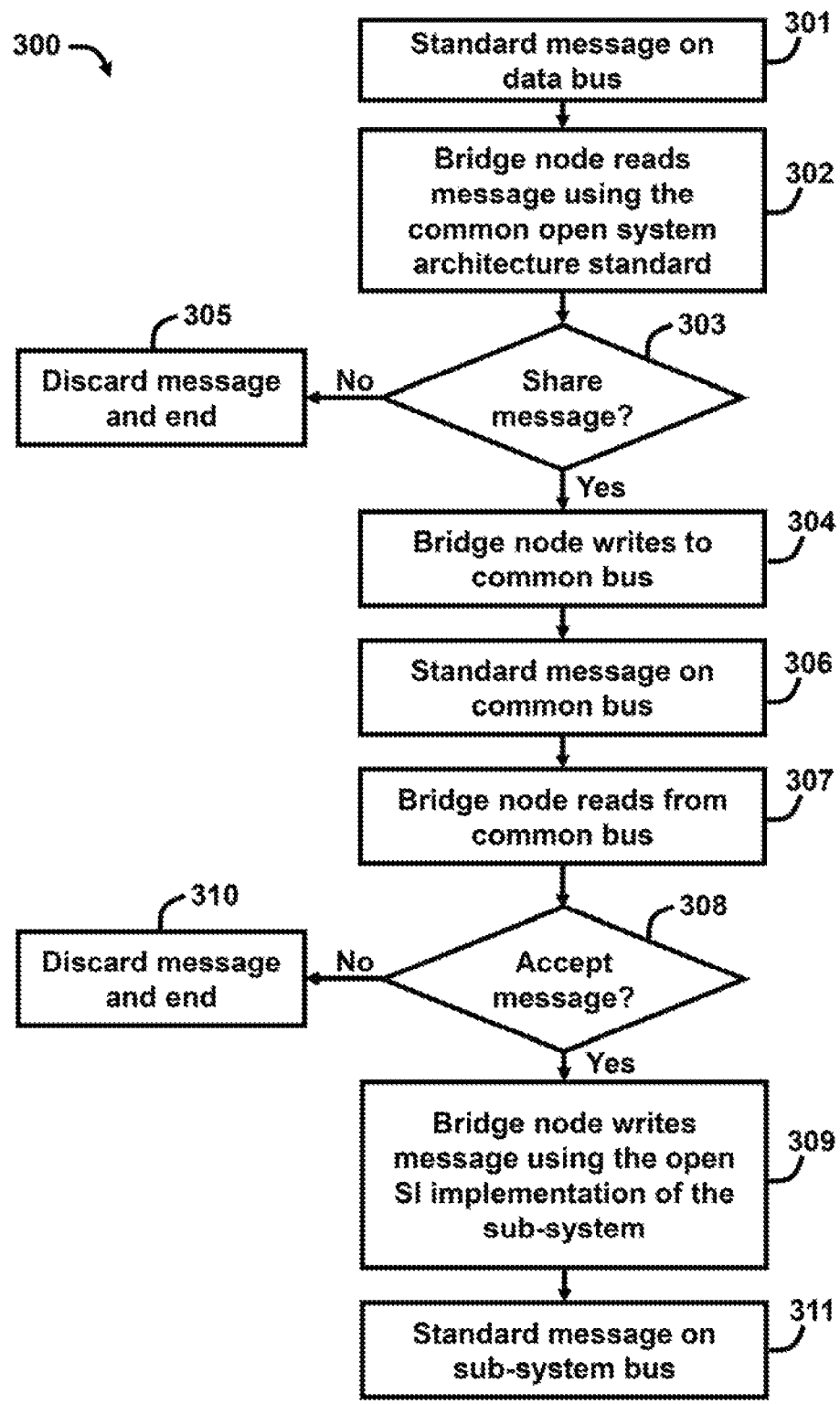
FIG. 16 is a flowchart illustrating a method to integrate two or more sub-computer systems in an open systems architecture using an open architecture bridge, according to an embodiment herein.

FIG. 16, with reference to FIGS. 1 through 15, is a flowchart illustrating a method 300 of bridging two sub-systems with proprietary implementations of a common open system architecture standard (e.g., common open system architecture standard 30, for example). The descriptions with respect to method 300 refer to components in system 10a, for ease of description. However, the method 300 is equally applicable to system 10b, as well as the other components as described above. The method 300 comprises, in block 301, an OSA standard message 31 or signal 50 (e.g., "Current Location") is generated by a component within a first sub-system (e.g., first sub-computing device $25_1$, for example). Components within the first sub-system (e.g., first sub-computing device $25_1$, for example) communicate through their data bus (e.g., data bus $46_1$, for example). The message 31 is therefore written to the data bus (e.g., data bus $46_1$) of the first sub-system (e.g., first sub-computing device $25_1$, for example).

In block 302, the bridge node (e.g., bridge node $27_1$, for example) in the first sub-system (e.g., first sub-computing device $25_1$, for example) reads the standard message 31 on the data bus (e.g., data bus $46_1$, for example) using the common open system architecture standard (e.g., common open system architecture standard 30, for example) of the first sub-system (e.g., first sub-computing device $25_1$, for example).

In block 303, the bridge node (e.g., bridge node $27_1$, for example) in the first sub-system (e.g., first sub-computing device $25_1$, for example) determines if the message 31 read is to be shared with other sub-systems (e.g., sub-computing devices $25_2 \ldots 25_N$, for example) based on system integration requirements. If the message 31 is to be shared (Yes) with other sub-systems (e.g., sub-computing devices $25_2 \ldots 25_N$, for example), then the method 300 writes the message 31 to the shared common bus 45 in block 304. Otherwise (No), the method 300 discards the message 31 in block 305 and the method 300 ends.

Next, in block 306, the OSA standard message 31 is output on the shared common bus 45, and the message 31 is optionally encapsulated in another protocol; e.g., TCP/IP, etc. The bridge node (e.g., bridge node $27_2$, for example) in a second sub-system (e.g., second sub-computing device $25_2$, for example) reads the standard message 31 on the shared common bus 45 in block 307.

Next, in block 308, the bridge node (e.g., bridge node $27_2$, for example) in the second sub-system (e.g., second sub-computing device $25_2$, for example) determines if the message 31 read is to be accepted based on system integration requirements. In block 309, if the message 31 is to be accepted (Yes), then the method 300 writes the message 31 to the bus (e.g., data bus $46_2$, for example) of the second sub-system (e.g., second sub-computing device $25_2$, for example). More particularly, the bridge node (e.g., bridge node $27_2$, for example) in the second sub-system (e.g., second sub-computing device $25_2$, for example) writes the standard message 31 on to the bus (e.g., data bus $46_2$, for example) of the second sub-system (e.g., second sub-computing device $25_2$, for example) using the open SI implementation of the second sub-system (e.g., second sub-computing device $25_2$, for example). Otherwise (No), the method 300 discards the message 31 and the method 300 ends, as indicated in block 310. Finally, in block 314, an OSA standard message 31 or signal 50 (e.g., "Current Location") is consumed by a component within the second sub-system (e.g., second sub-computing device $25_2$, for example) through the bus (e.g., data bus $46_2$, for example).

The embodiments herein remove the need for sub-system providers to share their open SI implementations with each other in order to integrate together into an overall system. Accordingly, a sub-system provider is able to protect its proprietary data, 75, 175 containing sub-system programming logic, configurations, operating conditions, capabilities, etc. Furthermore, the embodiments herein enable multiple SI implementations of the same open SI to be used seamlessly across the same system and therefore can help increase the speed of system integration.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:
1. A method comprising:
providing a host computer system;
establishing a common bus interface communicatively linked to the host computer system;
linking a plurality of sub-computer systems, which are integrated to a common open system architecture standard, with the host computer system, each sub-computer system of the plurality of sub-computer systems being linked to the common bus interface and comprising data-controlled implementation instructions of an open system integration based on the common open system architecture standard, and each sub-computer system comprising a data bus communicatively linked with the common bus interface;
transmitting a first data sharing request by a first sub-computer system of the plurality of sub-computer systems to the common bus interface in a first communication transport protocol;
receiving the first data sharing request by a second sub-computer system of the plurality of sub-computer systems from the common bus interface;
filtering, by the second sub-computer system, the first data sharing request based on second sub-computer system data-controlled implementation instructions;
transmitting, by the second sub-computer system, the first data sharing request to a second sub-computer system data bus when the second sub-computer system data-controlled implementation instructions accept the first data sharing request; and
encapsulating, by the common bus interface, the first data sharing request in a second communication transport protocol that is different from the first communication transport protocol,
wherein each sub-computer system comprises proprietary data comprising any of programming logic, system configuration data, system operating condition data, and system capability data that is shared with other sub-computer systems of the plurality of sub-computer systems only when data-controlled implementation instructions of a particular sub-computer system permits sharing.

2. The method of claim 1, wherein each sub-computer system is shielded from sharing data with other sub-computer systems of the plurality of sub-computer systems based on the data-controlled implementation instructions associated with each sub-computer system.

3. The method of claim 1, comprising filtering, by the first sub-computer system, the first data sharing request based on first sub-computer system data-controlled implementation instructions prior to transmitting the first data sharing request to the common bus interface.

4. The method of claim 1, wherein each sub-computer system comprises a component linked to the common bus interface to generate a data sharing request and process an accepted data sharing request.

5. The method of claim 1, comprising refusing a data sharing request by any of the plurality of sub-computer systems when data-controlled implementation instructions of a particular sub-computer system that is being requested to share data rejects the data sharing request.

6. A system for controlling data access comprising:
a host computing device;
a shared transport medium linked to the host computing device;
a plurality of sub-computing devices integrated to a common open system architecture standard with the host computing device, each sub-computing device of the plurality of sub-computing devices being integrated to the shared transport medium and comprising data-controlled implementation instructions of an open system integration based on the common open system architecture standard, and each sub-computing device comprising a data bus communicatively linked with the shared transport medium;

a first sub-computing device to transmit a first signal to the shared transport medium in a first communication transport protocol; and a second sub-computing device to:
  access the first signal on the shared transport medium; and
  process the first signal when second sub-computing device data-controlled implementation instructions permit processing of the first signal, wherein processing the first signal includes encapsulating by the shared transport medium the first signal into a second communication transport protocol that is different from the first communication transport protocol, wherein each sub-computing device includes a transceiver to transmit, access, and receive a signal from the shared transport medium, wherein each sub-computing device comprises proprietary data comprising any of programming logic, system configuration data, system operating condition data, and system capability data that is shared with other sub-computing devices of the plurality of sub-computing devices only when data-controlled implementation instructions of a particular sub-computing device permits sharing.

7. The system of claim 6, wherein each sub-computing device is shielded from sharing data with other sub-computing devices of the plurality of sub-computing devices based on the data-controlled implementation instructions associated with each sub-computing device.

8. The system of claim 6, wherein each sub-computing device comprises a filter to accept or reject a signal based on the data-controlled implementation instructions associated with the sub-computing device being asked to accept or reject the signal.

9. The system of claim 6, wherein the transceiver of each sub-computing device is to transmit the signal from the shared transport medium to the data bus of the sub-computing device being asked to accept or reject the signal when the data-controlled implementation instructions of the sub-computing device being asked to accept or reject the signal accepts the signal.

10. The system of claim 6, wherein any of the plurality of sub-computing devices refuses a signal when data-controlled implementation instructions of a particular sub-computing device that is being requested to share data rejects the signal.

* * * * *